United States Patent
Cathcart et al.

(10) Patent No.: US 6,854,440 B2
(45) Date of Patent: Feb. 15, 2005

(54) INTERNAL COMBUSTION ENGINES AND CONTROL

(75) Inventors: Geoffrey Paul Cathcart, Yokine (AU); Christian Chandrakumar Zavier, Morley (AU); Donald Andrew Railton, Duncraig (AU); John Roy McGrath, Brentwood (AU)

(73) Assignee: Orbital Engine Company (Australia) Pty Limited, Balcatta (AU)

( * ) Notice: Subject to any disclaimer, the term of this patent is extended or adjusted under 35 U.S.C. 154(b) by 0 days.

(21) Appl. No.: 10/204,442

(22) PCT Filed: Mar. 6, 2001

(86) PCT No.: PCT/AU01/00228
§ 371 (c)(1),
(2), (4) Date: Nov. 26, 2002

(87) PCT Pub. No.: WO01/65105
PCT Pub. Date: Sep. 7, 2001

(65) Prior Publication Data
US 2003/0140891 A1 Jul. 31, 2003

(30) Foreign Application Priority Data
Mar. 3, 2000 (AU) .............................................. PQ 6040

(51) Int. Cl.⁷ .............................................. F02B 31/00
(52) U.S. Cl. ........................ 123/298; 123/305; 123/306
(58) Field of Search ................................. 123/301, 305, 123/302, 306, 308, 90.15, 531, 298, 309

(56) References Cited

U.S. PATENT DOCUMENTS

| | | | | |
|---|---|---|---|---|
| 5,394,845 A | * | 3/1995 | Noh et al. | 123/308 |
| 5,762,042 A | | 6/1998 | Yoshikawa et al. | |
| 5,927,244 A | * | 7/1999 | Yamauchi et al. | 123/295 |
| 5,950,419 A | * | 9/1999 | Nishimura et al. | 60/274 |
| 5,960,767 A | * | 10/1999 | Akimoto et al. | 123/298 |
| 5,970,957 A | * | 10/1999 | Fried et al. | 123/516 |
| 6,065,444 A | * | 5/2000 | Jingu et al. | 123/301 |
| 6,276,330 B1 | * | 8/2001 | Adamisin et al. | 123/308 |
| 6,341,591 B1 | * | 1/2002 | Tsutsumi et al. | 123/295 |
| 6,360,715 B1 | * | 3/2002 | Stromberg et al. | 123/301 |
| 6,499,456 B1 | * | 12/2002 | Nogi et al. | 123/295 |
| 6,543,410 B2 | * | 4/2003 | Yoshida et al. | 123/301 |
| 6,615,795 B2 | * | 9/2003 | Martin et al. | 123/308 |
| 6,651,615 B2 | * | 11/2003 | Suzuki et al. | 123/305 |
| 6,672,277 B2 | * | 1/2004 | Yasuoka et al. | 123/295 |
| 6,684,848 B2 | * | 2/2004 | Saito et al. | 123/295 |
| 6,705,275 B2 | * | 3/2004 | Fukuzumi | 123/295 |
| 6,705,279 B2 | * | 3/2004 | Iriya | 123/301 |
| 6,745,745 B2 | * | 6/2004 | Huebler et al. | 123/307 |
| 2003/0010313 A1 | * | 1/2003 | Fukuzumi | 123/301 |
| 2004/0168671 A1 | * | 9/2004 | Yamaguchi et al. | 123/305 |

FOREIGN PATENT DOCUMENTS

| | | |
|---|---|---|
| DE | 19806272 C1 | 4/1999 |
| DE | 19852551 C1 | 6/2000 |
| EP | 893584 A2 | 1/1999 |

(List continued on next page.)

*Primary Examiner*—Hai Huynh
(74) *Attorney, Agent, or Firm*—Rothwell Figg Ernst & Manbeck, P.C.

(57) ABSTRACT

Disclosed is an internal combustion engine comprising at least one cylinder with a reciprocating piston to provide said engine with at least one combustion chamber, said combustion chamber further comprising a delivery injector for injecting fuel directly into said combustion chamber, said engine further comprising at least one valved inlet air duct for delivering combustion air into said combustion chamber, wherein at least said inlet air duct and/or its valve is arranged to provide a low tumble inlet port to said at least one combustion chamber, said combustion chamber, in use, having low in-cylinder tumble gas motion of said combustion air and wherein said low in-cylinder tumble gas motion of said combustion air reduces over-enleanment of fuel in end gas regions of said combustion chamber.

39 Claims, 9 Drawing Sheets

FOREIGN PATENT DOCUMENTS

| | | | | |
|---|---|---|---|---|
| EP | 924403 A1 | 6/1999 | | |
| EP | 1069291 | * 1/2001 | ........... | F02B/23/10 |
| EP | 1088972 | * 4/2001 | ........... | F02B/23/10 |
| JP | 10009050 A | 1/1998 | | |
| JP | 10169453 A | 6/1998 | | |
| JP | 274133 | * 10/1998 | ........... | F02M/61/14 |
| JP | 106158 | * 4/2003 | ........... | F02B/31/00 |
| JP | 262132 | * 9/2003 | ........... | F02B/31/00 |

* cited by examiner

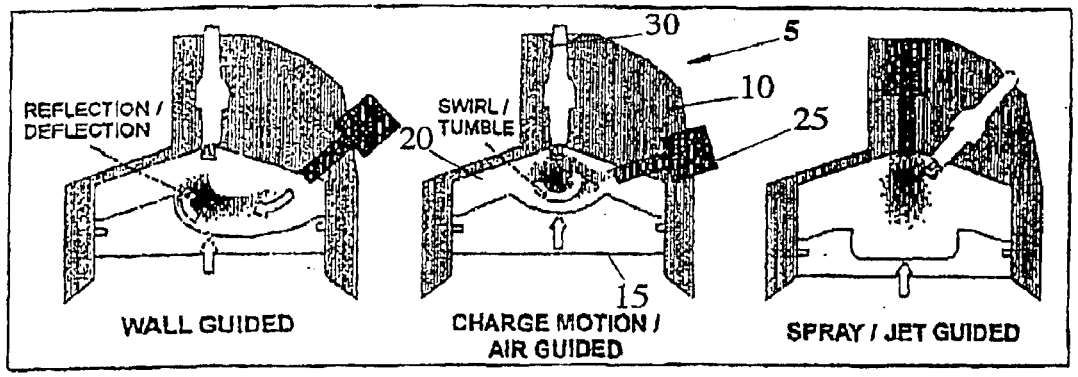
Fig 1. : Direct injection combustion systems
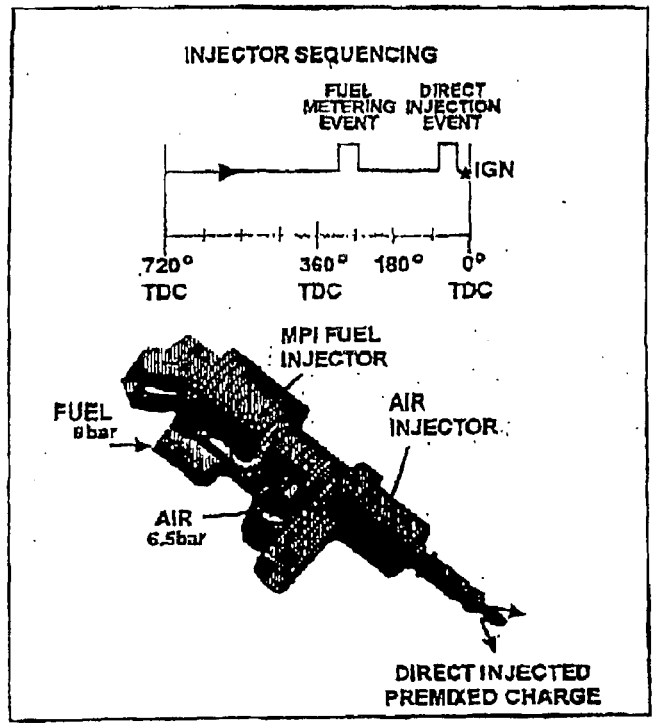
Fig 2. : Schematic of air-assisted direct fuel injection system.

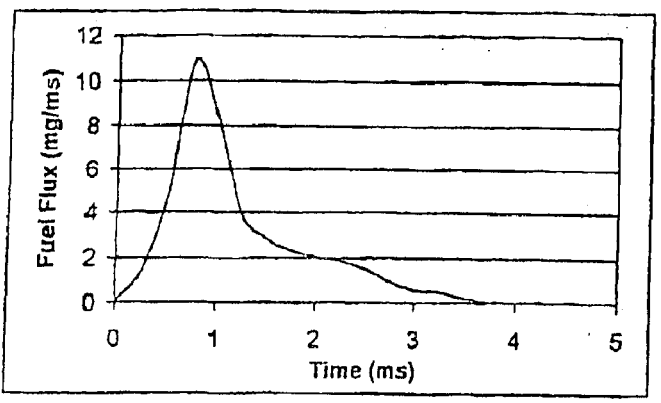
Fig 3. : Fuel flux profile through typical injection event
(10mg/shot, 6.5bar air injection pressure, atmospheric conditions)
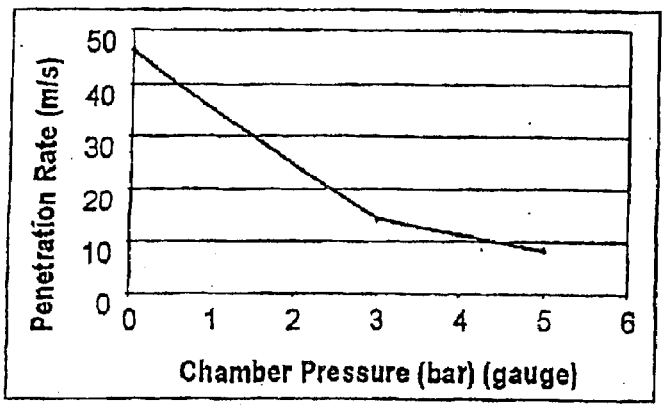
Fig 4. : Fuel spray penetration rate versus cylinder pressure
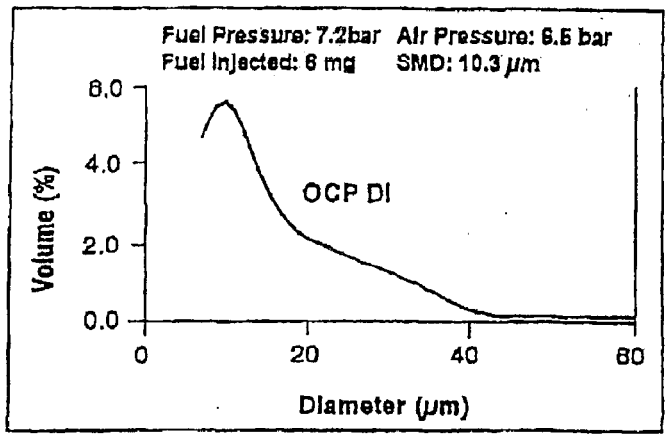
Fig 5. : Air assisted fuel injection system PDPA particle size data

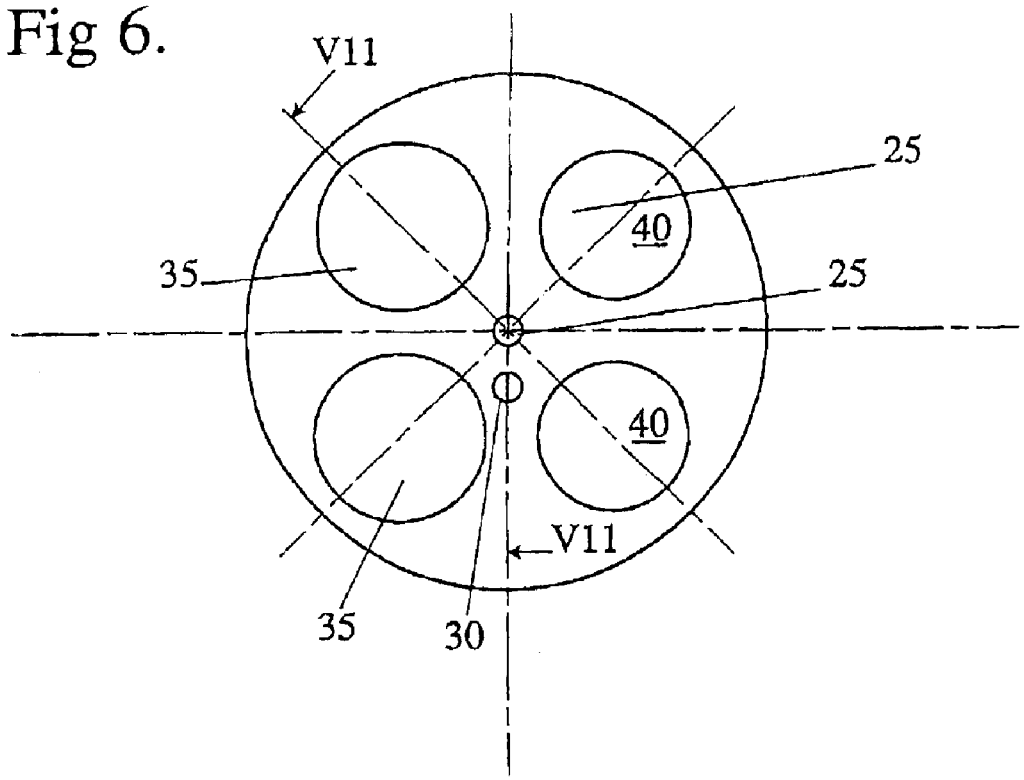

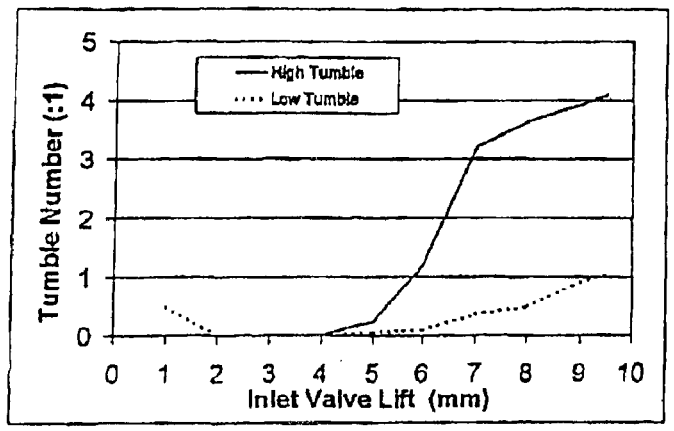
Fig 8. : Tumble flow measurements for low and high tumble inlet ports
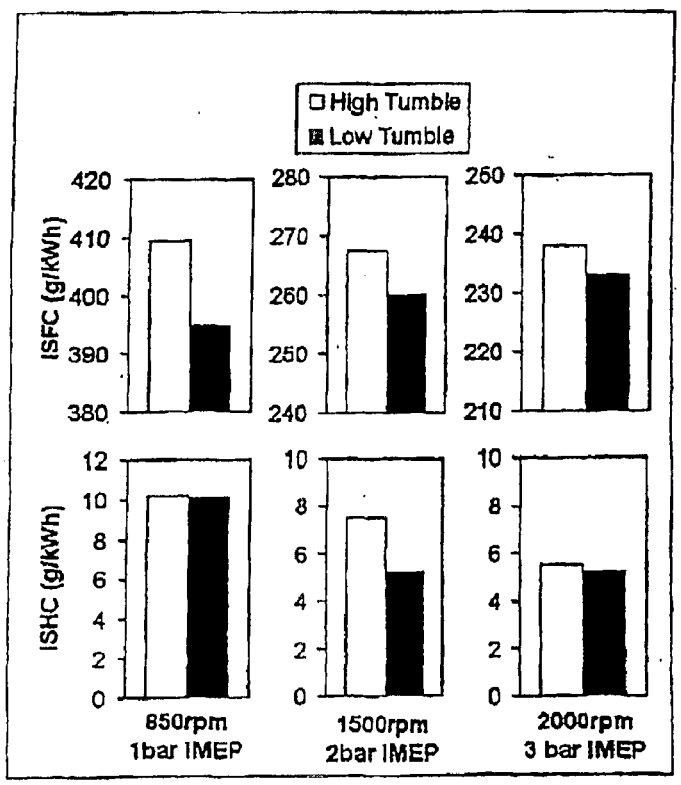
Fig 9. : Effect of tumble motion on fuel consumption and HC emissions

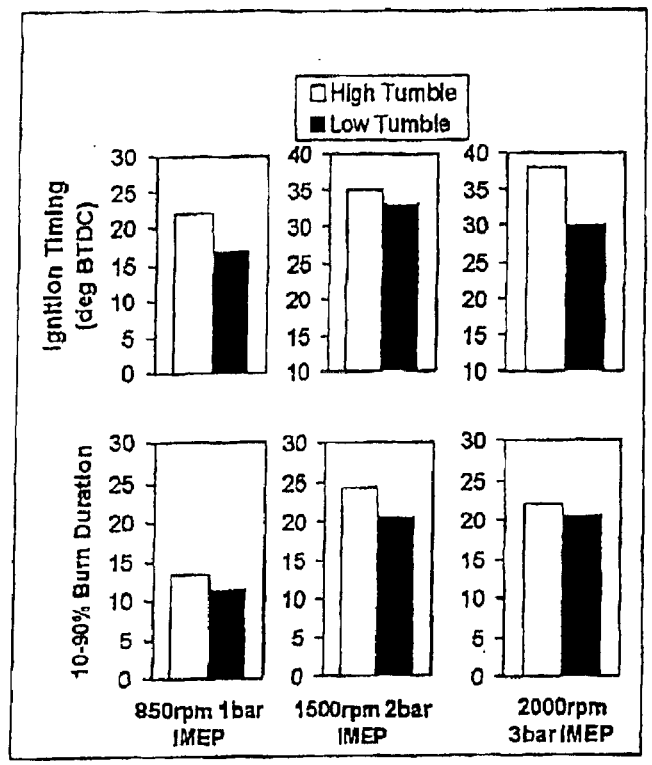
Fig 10. : Ignition timing and burn duration for different levels of tumble motion
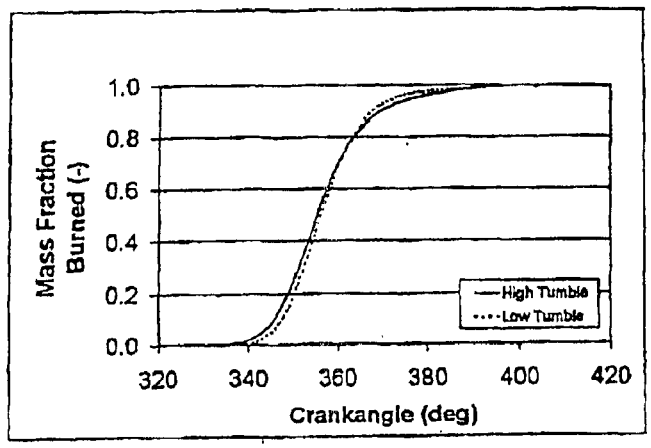
Fig 11. : Mass fraction burned profile at 1500rpm, 2.0bar IMEP for different levels of tumble motion

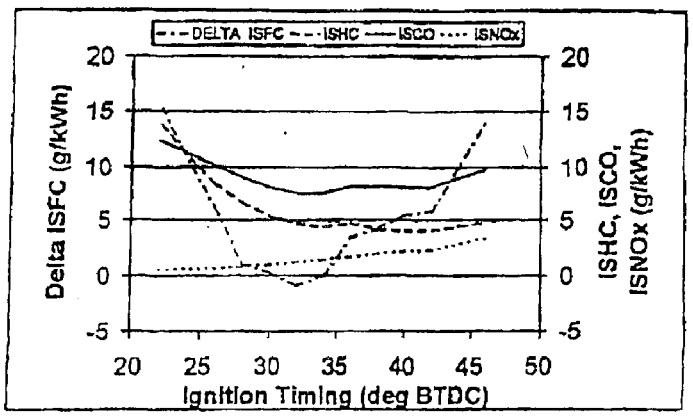
Fig 12. : Change in fuel consumption and emissions with ignition timing at 2000rpm, 3.0bar IMEP
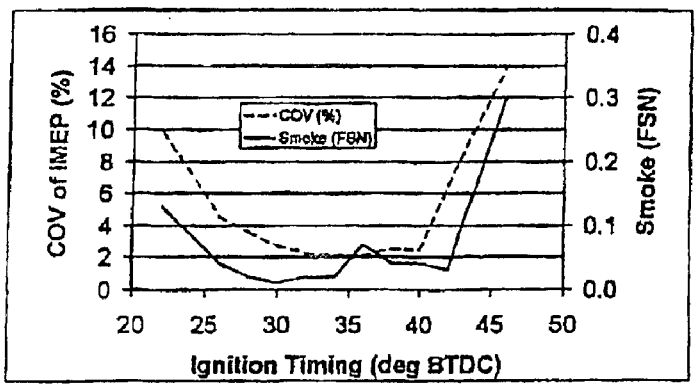
Fig 13. : Combustion stability and smoke levels versus ignition timing at 2000rpm, 3.0bar IMEP
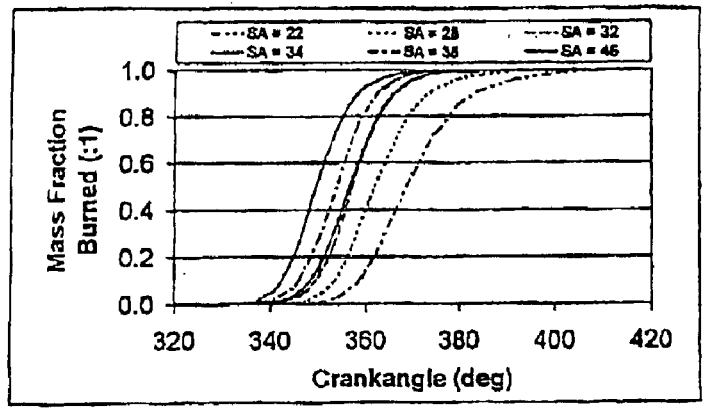
Fig 14. : Mass fraction burned profiles for different ignition timings at 2000rpm, 3.0bar IMEP

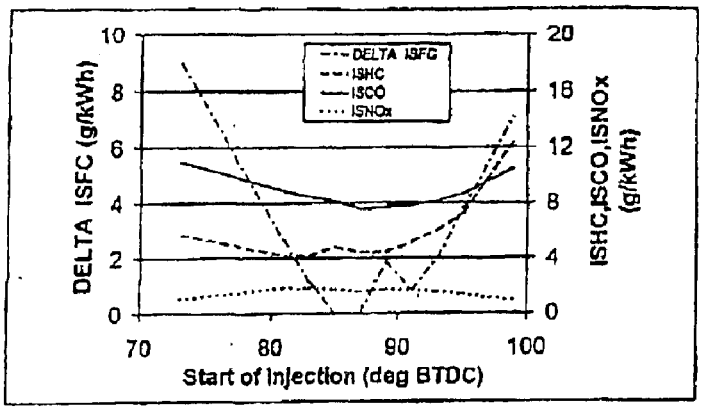
Fig 15. : Change in fuel consumption and emissions with injection timing at 2000rpm, 3.0bar IMEP
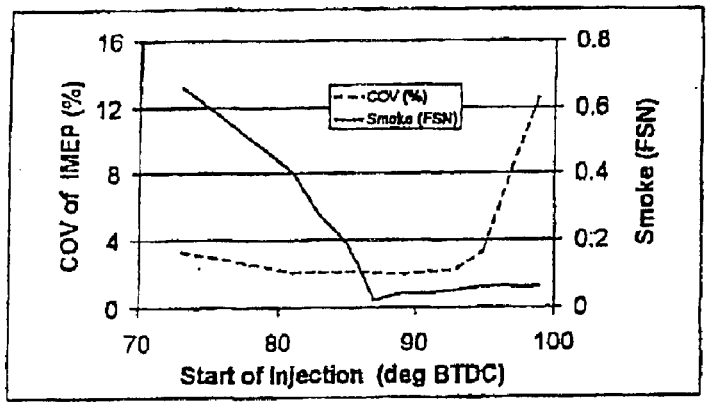
Fig 16. : Combustion stability and smoke levels versus injection timing at 2000rpm, 3.0bar IMEP
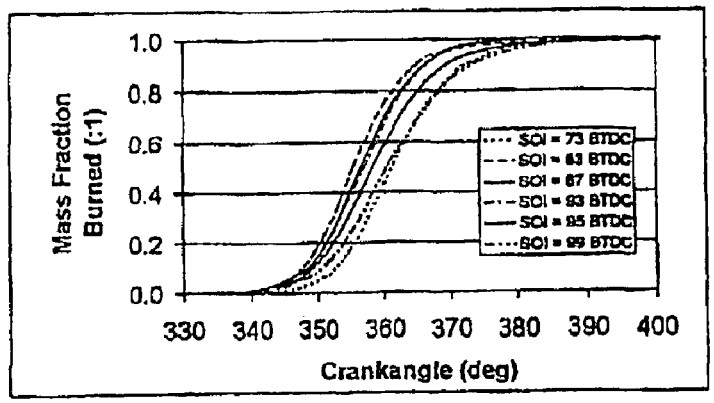
Fig 17. : Mass fraction burned profiles for different injection timings at 2000rpm, 3.0bar IMEP

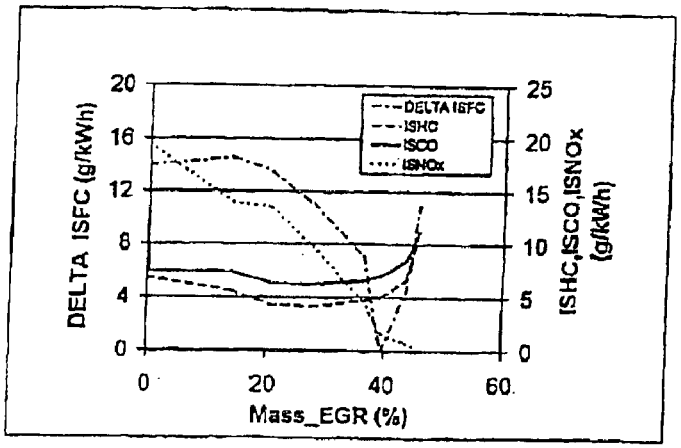
Fig 18. : Change in fuel consumption and emissions with EGR level at 2000rpm, 3.0bar IMEP (ignition and injection timings unchanged)
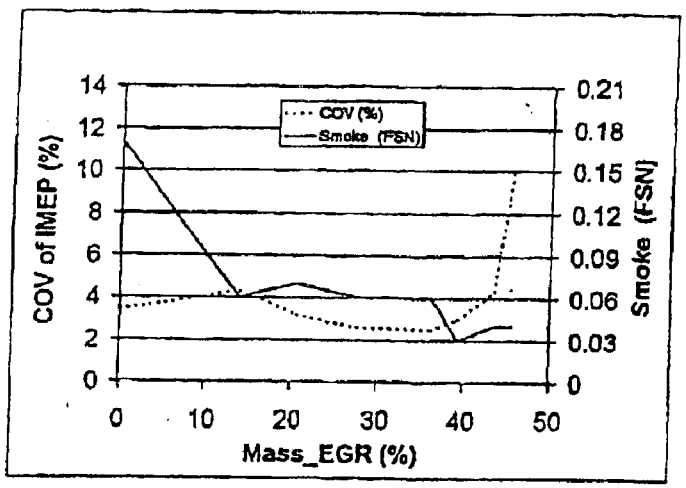
Fig 19. : Combustion stability and smoke levels versus EGR level at 2000rpm, 3.0bar IMEP (ignition and injection timings unchanged)

INTERNAL COMBUSTION ENGINES AND CONTROL

CROSS-REFERENCE TO RELATED APPLICATION

This application is a National Stage entry of International Application No. PCT/AU01/00228, filed Mar. 6, 2001, the entire specification claims and drawings of which are incorporated herewith by reference.

FIELD OF THE INVENTION

This invention is directed to spark-ignited internal combustion engines utilising direct in-cylinder (DI) fuel injection systems, in particular spray guided 5 systems and dual fluid injection systems, often referred to as air assisted injection (AADI) systems, and to the control of such internal combustion engines and particularly to four stroke engines utilising AADI gasoline fuel injection systems.

BACKGROUND TO THE INVENTION

Direct injection gasoline engine technology is becoming increasingly popular due to the potential to reduce fuel consumption with little compromise to what the automotive gasoline engine offers today in terms of power density and cost. In order to provide a better understanding of the invention described below, some background as to different types of fuel injection and combustion systems is appropriate.

Direct injected (DI) engines operate with fuel being directly Injected into the engine cylinders (ie combustion chambers), as compared to conventional fuel injected (FI) engines (also called manifold injected or PFI engines), where the fuel is injected into the intake manifold immediately behind the Inlet valve of the combustion chamber in order to carburise the fuel.

"High pressure direct injection"(HPDI) fuel systems are typically those where the injected fluid is solely fuel, and injection is carried out at high pressure (typically 50 to 120 bar). These systems have to be contrasted with so called "air (or gas) assisted direct injection" (AADI) fuel systems, where fuel is metered into a mixing chamber, of a delivery injector typically at constant pressure for mixing with air. This "dual fluid" is then injected at low pressure (typically 6 to 8 bar) into the cylinder combustion chamber.

Typically, with DI engines, the fuel injection or delivery device penetrates the combustion chamber through the cylinder head. An engine having an injection device that penetrates into the combustion chamber through a cylinder head with a fuel delivery direction having a generally axial orientation with respect to the combustion chamber axis may be referred to as a central direct injection engine. Engines that have an injection device that penetrates into the side of combustion chamber In order to deliver the fuel stream in a generally radial direction are commonly referred to as side direct injection engines.

The location of the fuel injector outlet in the combustion chamber in relation to the fuel ignition source (e.g. spark plug) and the type of fuel injection system employed, HPDI or AADI, influences the choice of specific charge transport mechanisms to ensure proper mixing of fuel with combustion air supplied through the inlet port, and ignition of the fuel-air mixture within the combustion chamber.

FIG. 1 of the accompanying drawings illustrates, in a highly simplified and schematic manner, three different mechanisms of charge (i.e. either fuel or fuel-air mixture) guidance within a cylinder of a four stroke internal combustion gasoline engine 5, the cylinder being identified at 10 (cylinder head and cylinder body). A reciprocating piston at 15 delimits the internal combustion chamber 20. For clarity purposes, the inlet and outlet valves have been omitted from FIG. 1, but their relative arrangement within cylinder head 10 and their location as viewed from the combustion chamber 20 is well known and illustrated in FIG. 6 for a four valve cylinder head type. It will be noted that the spark plug 30 is arranged with the spark gap close to the central axis of the cylinder 10. A direct fuel injector is represented at 25 at different locations, Le in central or side injection engine arrangement.

In "spray guided" (direct injection) combustion systems, the injector is typically located and arranged to direct the fuel spray to the spark plug gap so that reliance on secondary mechanisms for transporting fuel to the spark plug gap is minimised. In FIG. 1, this system arrangement is of a central spray guided type. On the other hand, so called "wall guided" combustion systems provide for transportation of the injected fuel to the plug gap by secondary mechanisms such as interaction of the injected fuel with a piston bowl and/or air motion within the cylinder. In so called "charge motion or air guided" systems, the motion of air entering into the combustion chamber through the inlet port(s) is used to achieve said transport of fuel, through swirl and/or tumble motion, towards the ignition zone.

The result of both charge guided and wall guided transportation methods is a longer preparation time of the fuel to create the carburated charge. This is typically the case for single fluid injection systems, as compared with AADI injection systems. This longer preparation time is in particular also important for HPDI systems because in such systems the injected fluid is solely fuel and there is the need to generate a fuel-air "cloud", ie the carburated charge, within the cylinder.

Modern gasoline direct injection engines generally attempt to generate a non-uniform distribution of fuel within the combustion chamber. This non-uniform distribution is commonly referred to as a stratified charge and means that typically one-region of the combustion chamber has a greater concentration of fuel than the remainder of the combustion chamber during certain load conditions. Engines that are adapted to operate in this fashion are commonly referred to as stratified charge engines. Stratified charge engines are theoretically free from the air fuel ratio limitations of homogenous charge engines (e.g. manifold injected engines are typically homogenous charge engines) where the intention is to achieve a uniform mixture of air and fuel throughout the combustion chamber prior to ignition under all load conditions. In contrast, a typical stratified charge engine operates with a stratified charge at low speed and low load conditions and operates with a homogenous charge at higher speed and load conditions.

In order to generate a stratified charge in an engine with a central injected fuel delivery system, the injection device would typically be timed to inject a fuel spray into the combustion chamber later in the combustion cycle compared with the injection timings required to generate a homogenous charge. By injecting later in the cycle, the fuel spray has a limited amount of time to mix with the intake air in the combustion chamber, resulting in a stratified charge of air and fuel. Homogenous charges on the other hand may be generated by injecting relatively early in the combustion cycle so that the fuel spray injected by the Injection device has sufficient time to mix with the intake air and thereby form a homogenous mixture of air and fuel (ie carburated fuel) within the combustion chamber.

As noted above, a sub-set of direct injected (DI) engines inci, a "spray guided" direct injected fuel combustion systems. In such engines, th injection device outlet is located such that the fuel spray Is issued so as to penetrate into the combustion chamber in close proximity to a fuel ignition device, typically the spark plug. A spray guided direct Injected fuel combustion system may be of a central Injection type. Accordingly, when a central injection spray guided engine generates a stratified charge, this stratified charge can generally be ignited by the ignition device as the spray from the centrally located injection device passes the ignition device. Typical timings attempt to ignite the tail of the spray so that the Injection device outlet is closed when combustion occurs. That is, spray guided systems do not transport the fuel spray from the injection device to the ignition device by use of a secondary means, as Is commonly the case with "wall guided" and "charge motion/air guided" systems. Accordingly, ignition occurs directly off the fuel spray delivered by the injection device. However, two of the major problems associated with single fluid implementation of spray guided combustion systems are spark plug durability and steep air/fuel ratio gradients which lead to poor robustness of combustion. These drawbacks are largely avoided with AADI combustion systems which has allowed their application to spray guided systems. However, even with AADI spray guided systems it has been found that the levels of emissions present in the engine out gasses indicate that spray guided systems can still generate imperfect and/or partial combustion of hydrocarbons present in the fuel. Hence there is a need, with ever more stringent emissions regulations, to reduce engine out emissions In order to avoid catalyst solutions that are either expensive or un-economic. There is also a need to improve fuel economy through improved combustion.

Stratified charge engines generally have fuel consumption benefits over homogenous charge engines. However, as a stratified charge has a lean-air fuel ratio when the combustion chamber is considered as a whole, it has generally been found that at various engine operating points the levels of oxides of nitrogen (NOx) emitted by stratified charge engines are higher than for comparable homogenous charge engines. Thus operating a spray guided direct injection fuel system in a stratified manner has the potential to further degrade the engine out emissions generally expected.

Stratified charge engines can generally operate under what is referred to as "fuel-led" control strategies where the amount of fuel delivered to the combustion chamber is independent of the quantity of air delivered to the combustion chamber by the intake manifold. This results in the engine torque and load being directly proportional to the amount of fuel delivered to the engine. In contrast, in a typical homogenous charge engine, the amount of fuel that can be delivered to the engine is dictated by throttle angle and hence air flow to the combustion chamber. Accordingly, such control strategies are referred to as "air-led" control strategies.

Typically, a "fuel-led" control strategy provides sufficient fuel to the combustion chamber such that the combustion chamber when viewed overall has a lean mixture of air and fuel. However as the fuel is localised to a specific region of the combustion chamber, this region is itself generally ignitable and so some of the issues associated with ignition and combustion of overly lean air fuel mixtures in homogenous charge engines are either reduced, preferably so as not to be significant or are eliminated altogether.

Having regard to the many variables that influence efficient combustion and the different types of fuel injection and combustion systems described above, with their distinctive advantages in some areas of engine operation/load, the system of choice is still unclear. Investigations continue on both wall or charge motion guided systems, as well as jet or spray guided systems, in relation to both HPDI and AADI systems. Recent studies such as Niefer, HG et al, "The DI Gasoline Engine: Quo Vadis-where does the road lead?", Vienna Motor Symposium, 1999; and Fraidl, GK et al, "Gasoline Direct Injection-The Low Fuel Consumption for EURO4", Vienna Motor Symposium, 1993 have identified the spray guided combustion system as the one with perhaps the most potential for a direct injected automotive gasoline engine. By the same token however, these last two documents have identified some areas of concern as regards emission control, see above. Reference should be made to these two documents which are hereby incorporated by way of short-hand cross-reference.

The present invention has been conceived in slight of a perceived need for further improvement of direct-injected, spark ignited internal combustion engines, in particular gasoline four stroke engines having poppet-style inlet and exhaust valves that use spray guided fuel injection systems and particularly AADI spray guided fuel injection systems. The present invention is more in particular concerned with mechanisms that influence the motion and/or containment of a stratified charge within the cylinder combustion chamber of a spray guided fuel injection system to thereby positively affect fuel consumption and emission levels in four-stroke, spark-ignited, stratified-operation engines.

SUMMARY OF THE INVENTION

According to a first aspect of the present invention there is provided an Internal combustion engine comprising at least one cylinder with a reciprocating piston to provide said engine with at least one combustion chamber, said combustion chamber further comprising a delivery injector for injecting fuel directly into said combustion chamber, said engine further comprising at least one valved inlet air duct for delivering combustion air into said combustion chamber, wherein at least said inlet air duct and/or its valve is arranged to provide a low tumble inlet port to said at least one combustion chamber, said combustion chamber, in use, having low in-cylinder tumble gas motion of said combustion air and wherein said low in-cylinder tumble gas motion of said combustion air reduces over-enleanment of fuel in end gas regions of said combustion chamber.

Preferably, the inlet air duct that terminates at the inlet port is arranged to create an air flow pattern, immediately behind and past the head of a poppet type valve selectively closing said port, whereby said low tumble gas motion is produced within the combustion chamber.

Preferably, said inlet air duct is shaped so as to avoid small radii of curvature of the inlet duct in close upstream vicinity of the inlet port valve seat that otherwise-contribute in generating air flow, vectors in combustion air being delivered through said inlet port into the combustion chamber that lead to tumble gas motion in said combustion chamber. It is believed that in reciprocating-type engines, air flow vectors that have a substantial radial orientation with respect to the cylinder axis contribute markedly to such tumble air flow within the cylinder. Air flow past the valve seat into the combustion chamber is influenced such as to create a more evenly distributed, axial air flow past the back side of poppet type valve heads that regulate air flow through the inlet port.

Such low in-cylinder motion of inlet air achieves acquiescent cylinder or a quiescent combustion chamber.

Preferably, the fuel injector is arranged as a spray-guided, central-injection direct fuel injector.

Advantageously, said fuel delivery injector is adapted to deliver fuel entrained in a gas into said combustion chamber, e.g. a gas-assisted direct injection fuel delivery system. Fuel entrained in said gas assumes a stratified mixture within said combustion chamber. Accordingly, the engine is arranged for operation with a spray-guided direct injection fuel delivery system of air-assisted type.

Low in-cylinder motion of inlet air is particularly suited to stratified operation of four stroke internal combustion engines, as the low in-cylinder motion reduces the degree of mixing between stratified charges of fuel entrained In injected air and intake air. Mixing of fuel with intake air can cause regions within the combustion chamber that are too lean for fuel therein to Ignite, resulting in higher emissions of hydrocarbons.

In this manner, an engine embodying the invention may achieve lower emissions and, better combustion stability than heretofore achieved.

It has been surprisingly found, in departure from the models suggested by H. G. Niefer et-al and H. Enres et al, supra, that providing "low tumble" inlet port/inlet port duct configurations in an internal combustion, spark-ignited engine that employs a direct in-cylinder fuel injection system of spray-guided, central injection type have marked advances over "high" tumble port configurations. Further, the inventive combination allows the implementation of a comparatively retarded ignition time window that results in improved thermal efficiency of the combustion process (Ie less fuel consumption) and potentially reduced emission levels.

The present invention thus finds preferred application in so called stratified charge engines with spray-guided, central direct injection fuel delivery systems and which engines have "low tumble inlet ports" that lead into the combustion chamber from the inlet manifold of the engine.

"Tumble" is a measure of rotational velocity of inlet air within a cylinder of an IC engine and is expressed as the ratio of this rotational velocity to the average cylinder air velocity. The parameter tumble ratio as used herein is measured in accordance with the technology described in Endres, H. et al, 5 "Influence of Swirl and Tumble on Economy and Emissions of Multi Valve SI Engines", SAE Technical, Series Paper No. 920516.

It has been found that "low-tumble", that is a tumble ratio of less than 2.0 is particularly beneficial in reducing over-enleanment of the stratified charge injected through an AADI in central spray-guided mode. The expression "low tumble" has to be put here in context with the tumble ratios that are typical of production versions of advanced PFI engines, such as the Ford "Zetec" engines. In the latter case, maximum tumble ratios of between 3 and 4 have been measured In such an engine, at 9 mm inlet valve lift. These values for a PFI engine can also be regarded as "low" when compared with production and prototype engines using wall-guided, direct-injection fuel delivery systems, where tumble ratios well in excess of 4.0 have been measured.

In accordance with the invention, the air intake manifold lines supplying the engine cylinders with charge air and/or the inlet valve seats are preferably designed to ensure an in-cylinder tumble ratio of about 2.0 or smaller over the whole range of inlet port valve lift values. Such tumble ratios should allow the engine-injector combination to achieve a notable Amprovement of fuel consumption and decrease of NOx values over a comparable base engine having tumble ratios in the vicinity of 4.0 or greater.

Depending on the geometry constraints of a cylinder head, e.g. room available to change the bending radii of the Intake air ducts in the vicinity of the inlet ports/valve seats, as well as other engine operation constraints at high load, it is preferred that the low tumble inlet port have an average tumble ratio of less than 1.50 over the entire range of valve lift, and more preferably of around 1.0 over a substantial part of inlet valve lift.

As noted previously, a preferred implementation of the invention is in engines with low-tumble inlet port configurations in combination with spray guided, stratified-charge, direct fuel injectors, as this combination allows to change ignition timings, under stratified conditions at least, whereby ignition may take place "earlier" in the compression stroke, ie at a reduced (crank shaft) angle before top dead center (BTDC) compared with the same engine arrangement but having high tumble inlet ports.

It has been found that a stratified-charge, central-injection, spray-guided engine can operate with ignition timings in the range of 5° to 40° BTDC over the engine load and speed range, though a more typical range of ignition timings would be 10° to 35° BTDC over the engine speed range of 400 RPM to 3600 RPM. It has also been found that ignition timings of 10° to 35° BTDC may also be used over an engine load range of 1 bar IMEP to 6 bar IMEP (where IMEP is indicated mean effective pressure). Alternate embodiments may utilise ignition timings of 10° to 35° BTDC over the engine speed and load range of 0.400 RPM to 3600 RPM and 1 bar IMEP to 6 bar IMEP.

In a second aspect of the invention there is provided an internal combustion engine comprising at least one combustion chamber having an inlet port with an associated inlet valve for inlet of combustion air to said chamber generally along a first axis, an ignition device and at least one fuel delivery means communicating fuel directly to said chamber in a direction generally parallel to said first axis and in the vicinity of said ignition device, wherein said generally parallel direction of said inlet air and said fuel reduces over-enleanment of fuel in end gas regions of said combustion chamber, and wherein said generally parallel direction is axial to said, combustion chamber.

According to a third aspect of the present invention, there is provided an internal combustion engine comprising at least one combustion chamber with a fuel delivery injector and an ignition means arranged for spray guided injection of fuel into said combustion chamber, said engine further comprising at least one valved inlet air duct for delivering combustion air into said combustion chamber, wherein at least said inlet air duct and/or its valve is arranged whereby low tumble gas motion is produced within said combustion chamber such as to reduce over-enleanment of fuel in end gas regions of said spray guided fuel.

It will also be appreciated that the above described combination of low tumble valved inlet port ducts and AADI fuel injectors can be combined in an engine with other measures to improve fuel burn and/or reduce exhaust emission levels, such as exhaust gas recirculation (EGR), injection pressure control of the dual-fluid injector during certain engine load conditions, enrichment of the air provided to the AADI injector with selected amounts of gases such as Oxygen or Nitrogen also during specified engine load conditions and other measures not explicitly mentioned herein. By way of example, SAE paper 950153 "Combustion and Emission Characteristics of Orbital's Combustion Process Applied to Multi-Cylinder Automotive Direct Injected 4-stroke Engines" outlines possible mechanisms to regulate air pressure in the injector as a function of fuel pressure or as a function of a variable representing a load condition of the engine. U.S. Pat. No. 5,207,204 (Japan Electronic Control Co) relates to an, air-assisted fuel injection system, where the air pressure is controlled in response to changes in the combustion chamber pressure such that a differential (optimum) pressure level is maintained during injection cycles. Similarly, SAE paper OOP-245 by Geoffrey Cathcart and Christian Zavier, "Fundamental Characteristics of an Air-Assisted Direct Injection Combustion System as Applied to 4-stroke Automotive Gasoline Engines", outlines that injection pressure, injected gas composition and EGR levels may also serve to influence charge stratification and combustion performance.

In particular the measures described in the last mentioned SAE paper, the contents of which is incorporated hereby by way of short hand cross-reference, in combination with charge motion control as provided through use of low tumble inlet air ducts/valves in combination with central injection of charge using AADI injectors accordance with the present invention are envisioned as complementary technology which may synergistically achieve better engine operating parameters.

Further preferred features and advantages of the invention will become apparent from the following description of an embodiment of the invention that Is provided with reference to the accompanying drawings.

BRIEF DESCRIPTION OF DRAWINGS

FIG. 1 is a schematic illustration of mechanisms of charge (fuel-air) types of direct in-cylinder injection combustion systems, namely spray/jet guided" "wall guided" and "charge motion/air guided";

FIG. 2 illustrates schematically a typical, air-assisted direct fuel injector that can be used in a direct injection engine embodying the invention;

FIG. 3 is a graph showing a fuel mass flux profile throughout the duration of a direct injection event in supplying fuel to an engine using the injector of FIG. 2;

FIG. 4 is a graph of the penetration rate of charge injected into a combustion chamber using the injector of fig 2;

FIG. 5 is a graph showing the droplet size distribution for a typical low load fueling event when employing the air-assisted fuel injector of FIG. 2;

FIG. 6 is a schematic plan bottom view of a four valve, single cylinder head 10, i.e. as viewed from inside the combustion chamber, illustrating the arrangement of inlet and outlet ports, spark plug and direct in-cylinder fuel injector of center injection type;

FIG. 8 is a graph representing tumble flow measurements for low high tumble inlet ports;

FIG. 9 is a graph illustrating the effect of tumble motion on fuel consumption and HC emissions;

FIG. 10 is a graph representing ignition timing and burn duration for different levels of tumble motion;

FIG. 11 is a graph representing mass fraction burned profile of an engine at 1500 rpm, 2.0 bar IMEP for different levels of tumble motion;

FIG. 12 is a graph representing the change in fuel consumption and emissions with ignition timing at 2000 rpm, 3.0 bar IMEP;

FIG. 13 is a graph representing combustion stability and smoke levels versus ignition timing at 200 rpm, 3.0 bar IMEP;

FIG. 14 is a graph representing mass fraction burned profiles for different ignition timings at 2000 rpm, 3.0 bar IMEP;

FIG. 15 is a graph representing the change in fuel consumption and emissions with injection timing at 2000 rpm, 3.0 bar IMEP;

FIG. 16 is a graph representing combustion stability and smoke levels versus injection timing at 2000 rpm, 3.0 bar IMEP;

FIG. 17 is a graph representing mass fraction burned profiles for different injection timings at 2000 rpm, 3.0 bar 1MEP;

FIG. 18 is a graph representing the change in fuel consumption and emissions with EGR level at 2000 rpm, 3.0 bar IMEP (ignition and injection timings unchanged); and FIG. 19 is a graph representing the combustion stability and smoke levels versus EGR level at 2000 rpm, 3.0 bar IMEP (ignition and injection timings unchanged).

DESCRIPTION OF PREFERRED EMBODIMENT

Figure 7B:
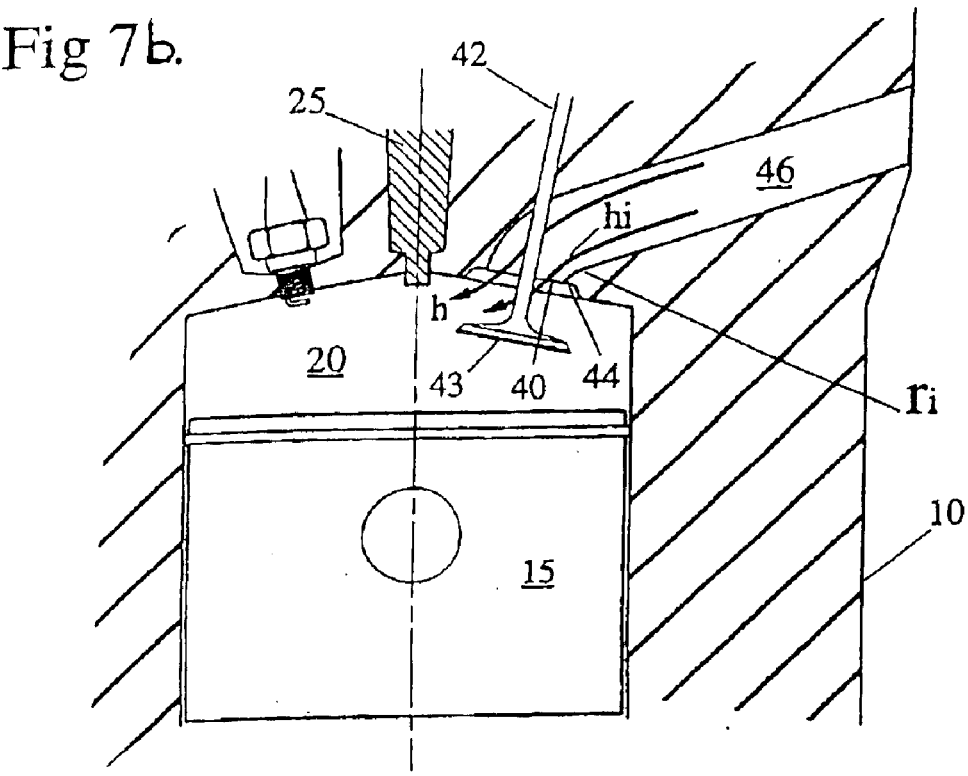
FIGS. 7a and 7b are longitudinal schematic sections taken along line VII—VII of FIG. 6, and depict in FIG. 7a a low tumble inlet port/intake manifold duct configuration and its construction relative to a high tumble Inlet port arrangement illustrated in FIG. 7b.

The present invention has identified that maintaining specified intake port flow characteristics positively Influence the combustion process where central direct fuel injection systems and particularly spray guided systems are employed in four stroke, spark ignited engines. A description of an experimental engine that embodies and confirms the potential advantages provided by the combination of low tumble inlet port engines and central spray guided fuel injection systems in accordance with the present invention will be given below.

Direct in-cylinder spray guided Injection systems may utilise air-assisted direct injection fuel systems to achieve good combustion of Injected fuel. Air-assisted direct injection fuel systems have many facets, which are unique in comparison to present single fluid direct injection systems based on delivery of fuel at high pressure. Perhaps the most obvious difference is the addition of a second fluid (normally air), apart from fuel, which is injected directly into the combustion chamber. The pressure, composition, and quantity of this second fluid, influences the operation of the engine. The combustion air flow into the combustion chamber through the valved inlet ports has been found to have an affect on stratification and containment of fuel clouds injected by dual fluid (airfuel) spray guided fuel systems in the vicinity of the ignition zone at the spark plug.

FIG. 2 illustrates a typical air-assisted, direct fuel injector. It shows an outwardly opening direct injector (or charge injector, incorporating a conventional style multi-point port fuel injector and an air injector, with an interface region providing the path between the air and fuel circuits and injectors. The conventional port injector provides the fuel metering function, operating with a constant differential pressure of normally 8 bar. The metered fuel is combined with air in the interface region, and this charge comprised of fuel and air is subsequently injected by the direct injector at a pressure of normally 6.5 bar gauge into the combustion chamber provided by the cylinders of the engine. Since the fuel metering is de-coupled from the direct injection event, the duration and timing of the direct injection event is essentially independent of the amount of fuel injected into the cylinder. Increasing the direct injection duration therefore does not increase the amount of fuel injected, but simply increases the amount of air injected, thereby increasing the overall dilution of the injected fuel with injected air. The separate fuel metering also results in the mass flux of fuel injected changing throughout the direct injection event, that is, there is not a constant mass flow rate of fuel through the direct injector versus time.

The rate of fuel delivered during the direct injection event can be altered by, changing the delay between the end of the fuel metering event and the start of the direct injection event, as well as the total direct injection duration. FIG. 3 shows a fuel mass flux profile throughout the duration of the direct injection event. This type of profile is typical of the air-assisted fuel system, and results in a comparatively fuel-lean mixture injected toward the end of the injection event. It is this characteristic of the air-assisted injection system which dramatically reduces the air/fuel ratio gradients near ignition timing, resulting in Improved robustness.

The air-assisted fuel system operates at relatively low pressures of nominally 6.5 bar gauge compared to current and future single fluid systems operating between 60 and 200 bar. This low injection pressure means that the penetration rate is strongly influenced by the cylinder pressure that the fuel is injected into. As cylinder pressure is increased, the penetration rate is reduced, as seen in FIG. 4. The low penetration rates at higher cylinder pressures enable good compression stroke. At these low injection pressures, the air-assisted injector produces the advantageous small droplet sizes characteristic of such injector system, predominantly through fuel droplet shearing. FIG. 5 shows the droplet distribution for a typical low load fueling event, with a SMD of approximately 10 j.Lm. A more detailed description of the operation of air-assisted fuel injection systems, is provided in Houston, R et al, "Combustion and Emissions Characteristics of Orbital's Combustion Process Applied to Multi-Cylinder Automotive Direct Injected 4-Stroke Engines", SAE 980153, the contents of which are hereby incorporated herein by reference.

It is known that prevailing in-cylinder flow fields have an affect over the condition of the fuel spray plume and the subsequent ignitiability of the charge supplied through a direct injection combustion system. With the low pressure air assisted direct injection system, combined with the spray guided combustion system, the injected charge is targeted at the spark plug gap location. The spray plume is contained in the vicinity of the spark plug gap through low penetration rates and piston bowl design. The present invention was conceived upon the realisation that a requirement for a higher mean flow velocity structures, such as tumble or swirl, as used for charge motion guided direct injection combustion, may not be required for spray guided systems. It is believed that existence of excessive in-cylinder mean flow may indeed be detrimental and cause over-mixing of the injected fuel cloud in spray guided systems, particularly finely atomised injected fuel mixtures, and accordingly degradation In the complete combustion of the stratification charge provided through a central spray guided injector system.

Tests, to verify the advantageous combination of central direct injection spray guided fuel systems and four-stroke, spark-ignited engines with air intake manifold lines that are modified to provide air delivery into the combustion chamber that is conducive in achieving what is termed "low tumble" within the combustion chamber, were conducted using a single cylinder research engine. For the tests, an air-assisted spray guided direct injection combustion system was incorporated in a 4V DOHC cylinder head based on the Ford Zetec engine. As forward tumble was assessed to be the predominant inlet induced flow for this type of cylinder head arrangement, different inlet duct/port modifications were made and tested to produce different levels of tumble.

The basic engine specifications are listed below in Table 1. For all results presented below, this was the specification of the engine unless otherwise stated.

| Displacement | 497 cc |
| --- | --- |
| Bore | 84.8 mm |
| Stroke | 88.0 mm |
| Compression Ratio | 10.7:1 |
| Inlet Port Configuration | Low tumble, No swirl |
| Valve Arrangement | 4 Valve, DOHC |
| Included Valve Angle | 40.0 degrees |
| Direct Injector | Synerject part # 37x-115 (100 deg Nozzle Seat Angle) |
| Fuel metering injector | Siemens Deka II |
| Air Injection Pressure | 6.5 bar gauge |
| Fuel Injection Pressure | 8.0 bar gauge |

Table 1. Single Cylinder Engine Specifications

The combustion chamber geometry used was representative of typical applications for 4 valve per-cylinder combustion chambers using a dual fluid spray guided combustion system, with the spark plug and injector located near the center of the combustion chamber, in-between the 4 valves, and the direct injector axis parallel to the cylinder bore axis. The spark plug gap was located in close proximity to the direct injector nozzle exit, providing the means to directly ignite the fuel air mixture as it passed through the spark plug gap. This arrangement can be gleaned from FIG. 1 and FIGS. 6 and 7 in particular.

Figure 7A:
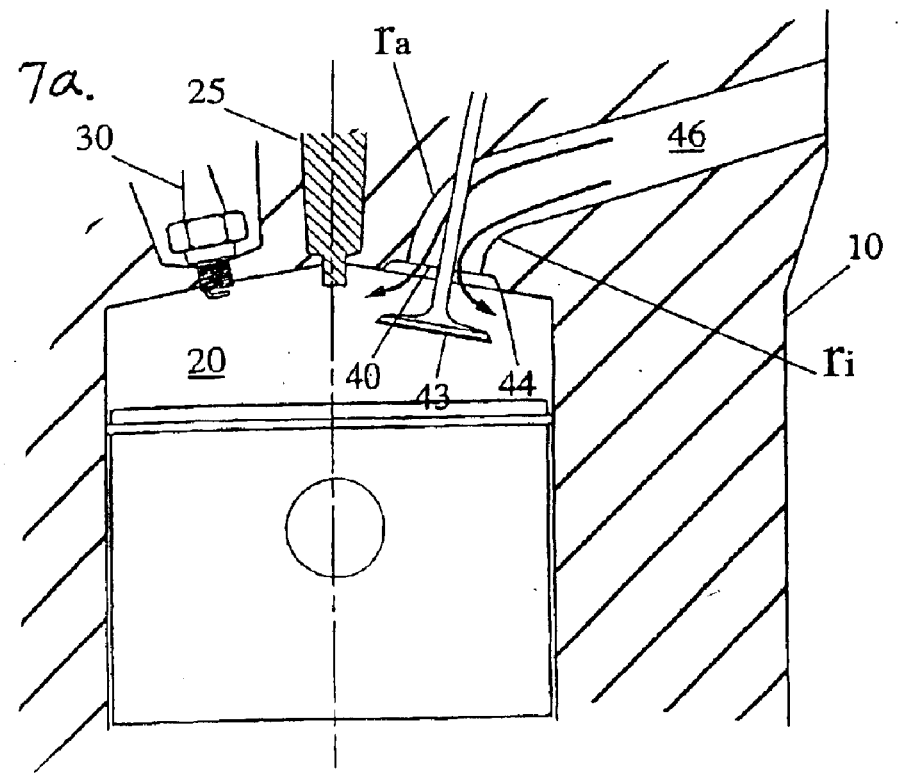

FIG. 6 is a schematic plan bottom view of a four valve, single cylinder head 10, i.e. as viewed from inside the combustion chamber, where reference numerals 35 identify two outlet ports closed by respective poppet valves, 40 identifies the inlet ports and 25 and 30 identify the fuel injector 25 and spark plug location, respectively. FIGS. 7a and 7b are longitudinal schematic sections taken along line VII—VII of FIG. 6, and show one of the inlet port poppet valves 42 with its head 43 lifted from its valve seat, identified at 44, at the port opening. 40 where the intake manifold line 46 communicates with the combustion chamber 20.

FIG. 7a depicts a low tumble inlet port/Intake manifold line 46 configuration and its construction relative to a high tumble inlet port arrangement illustrated in FIG. 7b. A low tumble configuration can be achieved by different constructional (lay-out) measures, which taken alone or in combination influence tumble of gas flow within the combustion chamber 20. These measures include, as currently understood, providing low turbulence air-flow immediately upstream the inlet port 40 within the intake duct 46, ensuring even air flow distribution past the back of the poppet valve head 43, reduced flow disturbance at the valve head 43 and its seat 44, influencing the direction in which air-flow is directed past the valve seat 44, altering the shape of the intake duct 46 and others.

For the tests, changes to the intake duct geometry were made. In FIGS. 7a and 7b arrows "I" and "h" are used to indicate typical gas flow paths past the intake ports 40 that are present with low tumble and high tumble configurations. Arrows "I" on the low tumble configuration of FIG. 7a indicate the near uniform, axial downward directed gas flow into the combustion chamber 20 desired to be present past the valve head 43 of valve member 42. It has been found that reducing radial directed flow components in the intake air will achieve a uniform gas flow associated with low tumble gas motion within an associated combustion chamber. Such uniform gas flow may be achieved by increasing the inner radii ri and outer radii ra of the intake duct 46 upstream of the intake port A1 over and above the corresponding inner radii ri(h) and outer radii ra(h) of a "conventional" duct trajectory which would otherwise be dictated by room constraints within the cylinder head alone. Such greater radii ri and ra are chosen to be of sufficient size to prevent or substantially reduce gas flow separation at the duct walls adjacent these curved portions, compared with gas flow separation occurring at the typically smaller radii identified and associated with high tumble port configurations. Such air-flow separation is depicted by gas flow arrow "hi" in FIG. 7b. This "failure" of the air flow to perform a congruent change of direction at the small inner radius of the duct 46 near the port location 40, due to the lack of guidance capability of the duct walls prior to expulsion of air past the port opening, results in a non-uniform gas flow distribution across the back of valve head 43. In other words, the main air flow vector past the port 40 still contains sufficient radial components to create a tumble effect within the combustion chamber.

Consequently, it is preferable for a low tumble inlet port arrangement to have a straight intake duct section upstream of its terminal end at port 40 (or seat 44) thereby to ensure gas flow through the port has a direction that has mainly axial flow vectors that assist in providing uniform gas flow past the valve head 43 when the valve head is in the open position.

It is clearly evident that-other measures can be adopted to aid in achieving low tumble gas motion within the combustion chamber such as to prevent disruption (as far as this is possible) of the stratified charge injected into the combustion chamber by an AADI injector.

FIG. 8 shows the tumble flow comparison performed on a steady-state flow bench. The "low tumble port" arrangement is shown to reduce the tumble flow within the cylinder over the full range of valve lift. The "high tumble" ports are similar to many current PFI engines and do not represent uncommonly high levels of tumble for such PFI engines. The low tumble ports of the test were machined by increasing the radius of the inlet duct near the inlet valve port seat in order to direct more flow to the back-side of the valve head, as described above.

Part load testing was performed with each inlet port configuration in order to quantify the effects of fuel consumption and emissions for the different In-cylinder flow regimes. At each point, the calibration was aimed toward lowest fuel consumption for a given NOx emissions level. Table 3 summarises the points tested with the corresponding NOx and COV constraints.

| Speed (rpm) | Load (IMEP bar) | NOx target (g/kWh) | COV of IMEP (%) |
|---|---|---|---|
| 850 | 1.0 | 1.9 | <6.0 |
| 1500 | 2.0 | 1.0 | <4.0 |
| 2000 | 3.0[1] | 1–.5 1 | <4.0 |

Table 2. NOx and COV Constraints for Tumble Comparison

FIG. 9 shows the fuel consumption and HC emissions for the two inlet port configurations. The results show that fuel consumption is reduced with the low tumble inlet port at each of the part load points, while HC emissions are maintained or reduced. The fuel consumption reduction achieved may to be due to the reduced over enleanment of the fuel in the end gas regions. One of the best indicators of this is the retarded ignition timing for best torque which are evident with the low tumble port arrangement.

FIG. 10 compares the ignition timing as well as burn durations for the high and low tumble ports at the three part load test points. In all cases, the ignition timing for best torque (minimum fuel consumption) is retarded for the low tumble port results.

The reason for the retarded ignition timing is due to-enhanced burn rates as shown from the reduction in burn duration. This is in contrast to homogeneous operation experience which generally shows increased burn rate for increased In cylinder motion. For the air-assisted spray guided stratified charge combustion systems, the reduction in over-mixing of the fuel in the extremities of the spray results in increased burn rates late in the combustion event. Indeed, when comparing the mass fraction burned profiles with high and low tumble, the reduction in the total burn duration for the low tumble ports is predominantly due to the reduction in the 80 to 100% fuel burned duration. The reduced over-mixing should also be indicated by reduced HC emissions. This reduction in HC emissions, however, is not evident in all the results; instead the HC emissions remain relatively constant for two of the part load points.

To explain this, it should be remembered that the ignition timing was retarded for the low tumble port results, and in isolation, this would lead to an increase in the hydrocarbon emissions (as described below). Therefore, the over-enleanment of the fuel needs to be reduced in order to maintain the same HC emissions level with a retarded ignition timing.

FIG. 11 shows the mass fraction burn profiles for low and high tumble at 1500 rpm, 2.0 bar IMEP. This clearly shows the increased burn rates late in the combustion event for the low tumble ports. This results in the superior phasing of the burn profile, with the majority of the burn able to be retarded.

The robustness of a dual fluid direct in-cylinder injection combustion systems was also tested by performing parameter scans centered around a typical part load calibration point, namely 2000 rpm, 3.0 bar IMEP. The baseline calibration for this point achieved an indicated specific NOx emissions level of less than 1.5 g/kWh. This low NOx level is typical of what the multi-cylinder and vehicle calibrations achieve at this speed/load point in order to satisfy composite drive cycle emissions targets. Table 4 shows the standard calibration settings and the baseline results from these settings. The robustness testing presented below was performed with a slightly different direct injector than for previous results presented. This injector has shown to provide further benefits in terms of fuel economy when optimising for low NOx emissions. With this injector, the NOx emissions level of less than 1.5 g/kWh is achieved with a net indicated specific fuel consumption of 225 glkWh.

TABLE 3

Baseline calibration and emissions results

| | |
|---|---|
| Speed (rpm) | 2000 |
| Load (IMEP in bar) | 3.0 |
| Ignition Timing (deg BTDC) | 34 |
| Start of Injection Timing (deg | 87 |

TABLE 3-continued

Baseline calibration and emissions results

| | |
|---|---|
| BTDC) | |
| End of Injection Timing (deg BTDC) | 32 |
| AIF Ratio (:1) | 24.6 |
| EGR (%) | 40 |
| ISFC (g/kWh) | 225 |
| ISHC (g/kWh) | 5.0 |
| ISNOx (g/kWh) | 1.44 |

Table 4. Baseline Calibration and Emissions Results

Three parameters were scanned in isolation; ignition timing, injection timing (fixed injection duration) and EGR rate. All other parameters remained constant, including fuel delivery, so a fluctuation in load was experienced during the testing.

FIG. 12 shows the change in specific fuel consumption and absolute emissions as a function of ignition timing. There is shown to be a region of ignition timing of 15 degrees (BTDC: before top dead-centre of piston motion) where
there is little effect on fuel consumption. There is a small reduction in fuel consumption for an ignition timing of 32 degrees BTDC, indicating that the baseline calibration, with an ignition timing of 34 degrees BTDC, may have been slightly over advanced. The HC and NOx emissions are seen to display a higher sensitivity to ignition timing as expected. As ignition advance is increased from the baseline, the NOx emissions are increased due to increased peak combustion temperatures. The HC emissions are reduced as the ignition is advanced some 6 degrees. Increasing the ignition advance further from this results in a gradual increase of HC emissions. This is due to reduced combustion stability, as the ignition point is no longer optimum with respect to the injection timing.

Conversely, as the ignition timing is retarded, the NOx emissions reduce, with a corresponding increase in HC emissions. The increase in HC emissions is due to the reduction in flame temperature nearing the end of combustion, reducing the lean-limit A/F ratio that can be successfully burnt. There is also greater time for dispersion of the fuel spray, leading to-increased enleanment of the extremities of the fuel cloud. Both these effects increase the amount of fuel where the flame is effectively quenched, increasing the unburnt hydrocarbon emissions.
less than 4%, which corresponds to standard deviation of IMEP of less than 0.12 bar.

FIG. 14 shows the mass fraction burned profiles corresponding to a range of ignition timings. As the ignition timing is retarded, the burn rate reduces, 5 most significantly in the region between 80 and 100% fuel burned.

By advancing the ignition timing past best torque, the 90% burned still advances, indicating sufficient mixing. For ignition timings more advanced than 40 degrees BTDC, the smoke level increases, due to the reduction in mixing time before flame front arrival. The loss in fuel economy as ignition timing is advanced is
due to the burn profile becoming too advanced, with over 90% of the fuel burned before TDC for the most advanced ignition timing. The baseline mass fraction burned profile appears advanced compared to typical homogenous charge profiles with MBT timings, with the empirical rule of the 50% burned location to be approximately 10 degrees ATDC. For the direct injection, stratified charge results presented, there is very little difference in IMEP for ignition'timings between 30 and 34 deg BTDC. Retarding the ignition timing from 34 degrees to 30 degrees BTDC results in less fuel burned before TDC, however, the burn rate for the last 20% of fuel burned is reduced. The net result between these two effects leads to very little change in the specific fuel consumption. As spark advance is reduced below 30
degrees BTDC, there is a reduction in IMEP without significant loss in combustion stability. This indicates that the ignition timing for the baseline calibration point was set near best torque without the constraint of combustion stability, and thus suggests that a simple requirement of having the 50% burn location approximately 10 degrees ATDC may not be the best indicator of optimum combustion phasing. As ignition timing is reduced further below 23 degrees BTDC (10 degrees retarded from the baseline calibration), the combustion stability degrades into occasional misfire situations.

FIG. 15 shows specific fuel consumption and emissions versus start of injection (SOI) timing with fixed ignition timing. The fuel consumption is again shown to be insensitive to changes in start of injection timing over a range of timings, with The HC emissions are relatively unchanged as the SOI is retarded, with Increases, however, as the SOI is advanced.

This increase in HC emissions is due to increasing loss of containment of the fuel, increasing the enleanment of the extremities of the fuel cloud. The NOx 5 emissions remain at a near constant level with changes in SOI timing.

FIG. 16 shows stability and smoke levels for the SOI scan. There exists a region of 20 degrees, centered approximately around the baseline calibration for SOI timing, where the COV of IMEP is less than 4%. The smoke level, however, is increased as injection timing is retarded. The retarded injection timing reduces the preparation time of the injected fuel leading to higher smoke levels. The pressure differential across the direct injector is also reduced as the injection timing is retarded, leading to larger droplet sizes injected near the end of the injection event. The reduction of preparation time and increased droplet size of the fuel injected near the end of the injection event compound to give quite a high sensitivity of smoke level to S01 once the injection is retarded past the baseline calibration timing.

From the mass fraction burned comparison (FIG. 17) it is clear why the fuel consumption shows little sensitivity to the S01 for the majority of timings, as there is little change in the profiles. At the extremes of S01 tested, the burn profile becomes retarded with respect to the baseline calibration, and an increase in specific fuel consumption results. For the advanced SOI, the stratification is becoming weaker, leading to slower burn rates throughout the combustion event, especially for the last 50% of fuel burned. This over-mixing is also evident with the increase In HC emissions observed, as already discussed. For the very retarded SOL there becomes inadequate mixing time for injected fuel prior to ignition timing. This increases the flame kernel development time. The burn rates during the bulk of the combustion event remain similar to the baseline point, albeit delayed in time due to the increased ignition delay, This indicates that there is good containment of the fuel spray as you would expect with the retarded SOI timing.

The results from the ignition and injection timing scans demonstrate the high robustness of the air-assisted spray guided direct injection combustion system. This is in contrast to many single fluid systems reported, and Indeed was one of the reasons for the movement toward wall or charge motion guided combustion systems for these injection systems, as is explained in a paper of M. Grigo et all, "Charge Motion Controlled Combustion System for Direct Injection SI Engines", Advanced Engine Design and Performance, GPC'98, and C. Preussner et all, "GDI: Interaction Between Mixture Preparation, Combustion System and Injector Performance", SAE paper no. 980498.

It is thought that one of the prime reasons for the robustness characteristics of dual fluid systems is due to the promotion of weak stratification gradients near the spark location during typical ignition timings. This is achieved by injecting air with the injected fuel as well as the ability to de-couple the fuel metering and direct injection events. As shown in FIG. 3, the mass flow rate of fuel injected from the direct injector is not constant. As the fuel flow rate decreases, the injected air flow rate typically increases. This results in a lean fuel mixture injected near the end of the injection event compared to the average over the total injection period. It is this injected mixture which forms the basis of the ignitable mixture for low part load stratified operation. The result is long periods where an ignitable mixture is maintained at the ignition source location, resulting in large windows of injection and ignition timings where stable combustion is maintained. This characteristic of the air-assisted spray guided combustion system is essential for ease of transfer to vehicle applications.

An EGR (Exhaust Gas Recirculation) scan was also performed with constant inlet manifold pressure while the other parameters were held at the baseline value. As EGR level was increased or decreased from the baseline level, the airflow through the engine decreased or increased respectively. FIG. 18 shows the effect on specific fuel consumption and emissions with varying levels of EGR. The specific fuel consumption increases slightly when the EGR level is shifted from the baseline calibration of approximately 40%. This is due to the burn rates in the combustion event being influenced by the concentrations of EGR in the trapped charge. For increasing levels of EGR, the burn rate is reduced, resulting in an ignition timing that is too retarded, and vice-versa. The HC the EGR level is increased above 45%. This increase co-incides with the reduction in combustion stability (FIG. 19). The NOx emissions are seen to be very sensitive to the EGR level, with increasing EGR level reducing NOx emissions, and reducing EGR level resulting in quite rapid increases in NOx emissions. This high sensitivity is due to several compounding factors. As previously discussed, the injection and ignition timings remain at the baseline calibration values as the EGR level is changed. Increasing EGR level results in reduced burn rates leading to a more retarded burn profile which reduces NOx emissions. As the EGR level in reduced, the burn rates increase, leading to an advanced burn profile which increases peak cylinder temperatures, increasing NOx emissions. If the ignition timing is re-optimised for each EGR level to account for the change in burn rates, the NOx emissions become much less sensitive to these changes in EGR level.

Another compounding effect is due to the changing composition of the 15 exhaust gas re-circulated into the engine. The manner in which the EGR scan was performed, that is maintaining a constant inlet manifold pressure, dictates that as the EGR level is reduced, the A/F ratio increases. This means that not only does the mass of EGR reduce, but the concentration of combustion products in the EGR, such as carbon dioxide, reduces, while the unburned oxygen concentration increases. This increase in oxygen concentration tends to further increase the NOx emissions production. The net effect of these results in the high sensitivity to EGR level as shown in FIG. 18: By maintaining a constant A/F ratio and re-optimising ignition timing as the EGR level is changed, the sensitivity of NOx emissions to EGR level, is significantly reduced. For example, an EGR scan performed in this manner on the same hardware configuration, showed for a reduction of 5% EGR from 40% to 35%, the NOx emissions increased from 1.5 g/kWh to only 1.9 g/kWh, compared to 4.8 g/kWh for the data set presented here.

The combustion stability, as shown in FIG. 19, is maintained as the EGR level is reduced to zero. There exists a 5°/a margin for the increase in EGR level for which combustion stability remains at an acceptable level. Increasing the EGR level beyond this level results in loss of stability, with the onset of partial burns and occasional misfiring cycles.

The smoke level remains relatively constant for changes of EGR level, at a nominal level of approximately 0.06 FSN or less. There is a small trend of increasing smoke level as the EGR level is reduced, with quite a large increase once the EGR level is reduced below 10%. This effect is seen even though the A/F ratio is increasing as the EGR rate is decreasing. The reason for this increase is due to the other calibration parameters, particularly ignition timing, remaining constant for the scan. As previously discussed, when the EGR level is reduced, the burn rate increases, resulting in less time between fuel injection and flame front arrival. This reduction in preparation time results in the increases in smoke levels recorded. By optimising ignition timing for each, particular EGR level this effect may be removed. From previous EGR scans performed, the smoke level can be maintained below 0.1 FSN across the entire range with optimised ignition and injection timings.

Modifications and variations to the engine and system of the present invention may be apparent to the skilled reader of this disclosure. Such modifications and variations are within the scope of the present invention.

What is claimed is:

1. An Internal combustion engine comprising at least one cylinder with a reciprocating piston to provide said engine with at least one combustion chamber, said combustion chamber further comprising a delivery injector for injecting fuel directly into said combustion chamber, said engine further comprising at least one valved inlet air duct for delivering combustion air into said combustion chamber, wherein at least said inlet air duct and/or its valve is arranged to provide a low tumble inlet port to said at least one combustion chamber, said combustion chamber, in use, being quiescent through having low in-cylinder tumble gas motion of said combustion air and wherein said low in-cylinder tumble gas motion of said combustion air reduces over-enleanment of fuel in end gas regions of said combustion chamber, wherein said engine is arranged for spray-guided combustion.

2. Engine according to claim 1, wherein the inlet air duct that terminates at an inlet port in the combustion chamber is arranged to create an air flow pattern, immediately behind and past the head of a poppet-type valve selectively closing said port whereby low tumble gas motion is produced within said combustion chamber.

3. Engine according to claim 1, wherein said inlet air duct is shaped so as to avoid small radii of curvature of the inlet duct in close upstream vicinity of the inlet port valve seat that otherwise contribute in generating air flow vectors in combustion air being delivered through said inlet port into the combustion chamber that lead to tumble gas motion in said combustion chamber.

4. Engine according to claim 1, wherein the engine is of spark-ignited, reciprocating-type in which a piston reciprocates within a cylinder substantially along a longitudinal axis thereof, and wherein the inlet air duct and/or valve selectively closing the inlet air duct is arranged to minimize inlet air flow vectors that have a substantial radial orientation with respect to the cylinder axis.

5. Engine according to claim 4, wherein the valve is a poppet-type valve, and wherein the intake air duct configuration upstream of the valve seat is such as to create an air flow past the back side of the poppet type valve head that is predominantly axial in orientation and substantially evenly distributed across the valve head back surface.

6. Engine according to claim 1 wherein the fuel injector is arranged as a central-injection direct fuel injector.

7. Engine according to claim 1, arranged for spray-guided combustion.

8. Engine according to claim 1 wherein said fuel delivery injector is adapted to generate a stratified charge within said combustion chamber.

9. Engine according to claim 1 wherein the valved inlet air duct is arranged to provide gas motion in said combustion chamber having a tumble ratio that is less than about 2.0 over the whole range of inlet port valve lift values.

10. Engine according to claim 1, further including an ignition timing system for selective ignition of a stratified charge delivered into the combustion chamber through said fuel delivery injector, said ignition timing system arranged to provide ignition timings in the range of about 5° to 40° BTDC during a compression stroke and over a defined engine load and speed range.

11. Stratified-charge, central-injection, spray-guided, spark-ignited engine according claim 10, wherein the ignition timing system is arranged for operation with a range of ignition timings of about 10° to 35° BTDC over an engine speed range of 400 RPM to 3600 RPM.

12. Stratified-charge, central-injection, spray-guided, spark-ignited engine according claim 10, wherein the ignition timing system is arranged for operation with a range of ignition timings of about 10° to 35° BTDC over an engine load range of 1 bar IMEP to 6 bar IMEP.

13. An engine according to claim 1 wherein said combustion chamber is further arranged whereby said low tumble gas motion is produced within said combustion chamber.

14. An engine according claim 1 wherein said fuel delivery means for delivering fuel directly to said combustion chamber is adapted to deliver fuel with a mass flow rate that is not constant during a fuel delivery event.

15. An engine according to claim 14 wherein said mass flow rate provides rich mixtures during an initial portion of said fuel delivery event.

16. An engine according to claim 14 wherein said mass flow rate provides lean fuel mixtures during a latter portion of said fuel delivery event.

17. An engine according to claim 1 wherein said engine operates with a co-variance of indicated mean effective pressure of less than 4% for ignition timings in the range of at least 30 degrees before top dead centre to 40 degrees before top dead centre.

18. An engine as claimed in claim 17 wherein said covariance of indicated mean effective pressure of less than 4% occurs at least for part load operating points such as 2000 revolutions per minute and 3.0 bar indicated mean effective pressure.

19. An engine according to claim 1 wherein said engine operates with an ISNOX of less than 2.0 g/kWh for timings of start of a fuel delivery event in the range of at least 75 degrees before top dead centre to at least 95 degrees before top dead centre.

20. An engine as claimed in claim 19 wherein said timings for said start of said fuel delivery event are effective at least for part load operating points such as an engine load of 3.0 bar indicated mean effective pressure and for an engine speed of 2000 revolutions per minute.

21. An engine according to claim 1 wherein said engine operates with a covariance of indicated mean effective pressure of approximately 4% or less with a mass of exhaust gas recirculation in a combustion charge of less than approximately 40%.

22. An engine according to claim 21 wherein said mass of exhaust gas recirculation is maintained above approximately 15% whereby combustion smoke is maintained below approximately 0.07 FSN.

23. An engine as claimed in claim 21 wherein said mass of EGR is effective at least for part load operating points such as 2000 revolutions per minute and 3.0 bar indicated mean effective pressure.

24. An engine according to claim 1 wherein fuel spray issuing from said delivery means operates with fuel spray penetration rates of substantially 45 meters per second or less for combustion chamber pressures of greater than substantially 0.0 bar gauge.

25. An engine according to claim 1 wherein fuel spray issuing from said delivery means operates with fuel spray penetration rates of substantially 15 meters per second or less for combustion chamber pressures of substantially greater than 3.0 bar gauge.

26. An engine according to claim 1 wherein said combustion chamber comprises a spark plug located down stream of an outlet of said fuel delivery means whereby in operation at least a portion of fuel spray issuing from said fuel delivery means is directed into a spark gap of said spark plug and wherein said fuel spray has a low penetration rate whereby at least a portion of said fuel spray is maintained in the vicinity of said spark plug at ignition.

27. An engine as claimed in claim 26 wherein said low penetration rate is less than substantially 45 meters per second for a combustion chamber pressure of substantially 0.0 bar gauge or greater.

28. An engine as claimed in claim 26 wherein said low penetration rate is substantially 15 meters per second or less for combustion chamber pressures of substantially 3.0 bar gauge or greater.

29. An engine according to claim 1 wherein said fuel delivery injector is adapted to deliver fuel entrained in a gas into said combustion chamber, and in particular is a gas-assisted direct in-cylinder fuel injector.

30. An engine according to claim 29 wherein said fuel entrained in said gas is delivered with a mass flow rate that is not constant.

31. An engine according to claim 29 wherein said injector is a gas assisted direct in-cylinder fuel injector wherein fuel is metered to said injector separately to delivery of fuel from said injector to said combustion chamber entrained in said gas whereby said fuel is delivered with a mass flow rate that is not constant.

32. Engine according to claim 1 wherein the valved inlet air duct is arranged to provide gas motion in said combustion chamber having a tumble ratio that is less than 1.5 over a substantial part of inlet valve lift.

33. Engine according to claim 1 wherein the valved inlet air duct is arranged to provide gas motion in said combustion chamber having a tumble ratio that is about 1.0 over a substantial part of inlet valve lift.

34. Internal combustion engine comprising at least one combustion chamber having an inlet port with an associated inlet valve for inlet of combustion air to said chamber generally along a first axis, an ignition device and at least one fuel delivery means communicating fuel directly to said chamber in a direction generally parallel to said first axis and in the vicinity of said ignition device, wherein said generally parallel direction of said inlet air and said fuel reduces over-enleanment of fuel in end gas regions of said combustion chamber, and wherein said generally parallel direction is axial to said combustion chamber, wherein said engine is arranged for spray-guided combustion.

35. An engine as claimed in claim 34 wherein said fuel is delivered so as to provide a stratified charge in said combustion chamber having said end gas regions.

36. An engine as claimed in claim 34 wherein said inlet air has limited radial flow relative to said generally parallel direction.

37. Internal combustion engine comprising at least one combustion chamber with a fuel delivery injector and an ignition means arranged for spray guided injection of fuel into said combustion chamber, said engine further comprising at least one valved inlet air duct for delivering combustion air into said combustion chamber, wherein at least said inlet air duct and/or its valve is arranged whereby low tumble gas motion is produced to achieve quiescence within said combustion chamber such as to reduce over-enleanment of fuel in end gas regions of said spray guided fuel.

38. An internal combustion engine as claimed in claim 37 further arranged to inject stratified charges of fuel into said combustion chamber.

39. An internal combustion engine as claimed in claim 37 wherein said tumble motion is less than 2.0.

* * * * *